T. N. JONES.
DRENCHING DEVICE.
APPLICATION FILED AUG. 13, 1909.
969,482.
Patented Sept. 6, 1910.
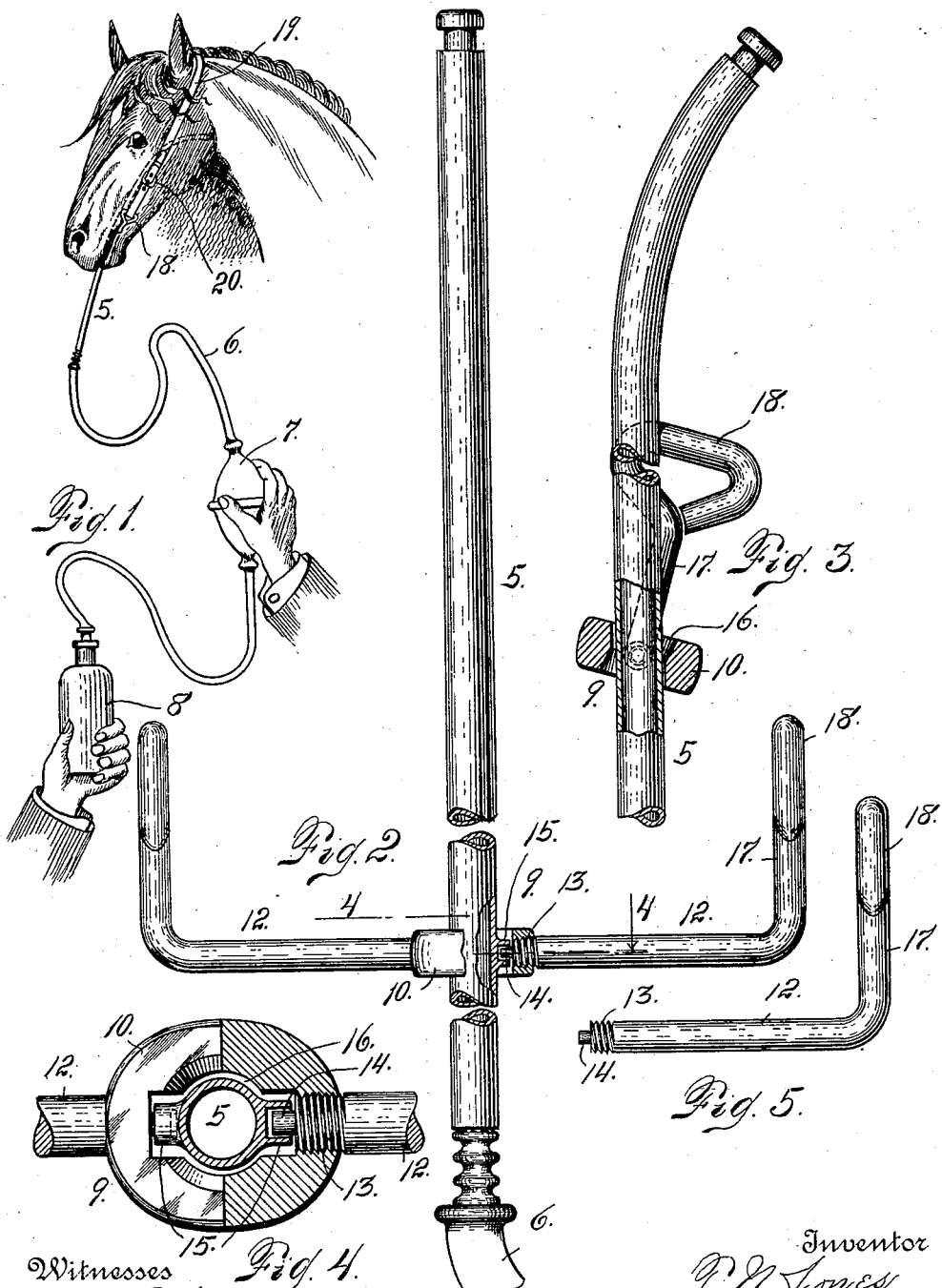

ent, since this is necessary in order that the
tongue of the horse may be allowed the

UNITED STATES PATENT OFFICE.

THEODORE N. JONES, OF DENVER, COLORADO, ASSIGNOR OF ONE-THIRD TO JOHN H. HALL, OF HASTINGS, NEBRASKA.

DRENCHING DEVICE.

969,482.

Specification of Letters Patent. Patented Sept. 6, 1910.

Application filed August 13, 1909. Serial No. 512,687.

*To all whom it may concern:*

Be it known that I, THEODORE N. JONES, a citizen of the United States, residing at the city and county of Denver and State of Colorado, have invented certain new and useful Improvements in Drenching Devices; and I do declare the following to be a full, clear, and exact description of the invention, such as will enable others skilled in the art to which it appertains to make and use the same, reference being had to the accompanying drawings, and to the numerals of reference marked thereon, which form a part of this specification.

My invention relates to improvements in means for administering medicine in liquid form to animals, being more especially intended for use with horses. I therefore term it a drenching device.

This apparatus is arranged to administer liquid to horses, or other animals without changing the normal or natural position of the head and is constructed in such a manner that the liquid is injected into the upper part of the esophagus, and when so administered, the animal is obliged to swallow it. Hence it is not necessary to raise the horse's head or tilt the mouth upwardly, as is sometimes practiced in administering liquid to horses.

In my improved construction, I employ a metal tube of sufficient length to reach to, or approximately to, the upper part of the esophagus. Upon this tube, is mounted a yoke which projects laterally on both sides of the tube and is adapted to protrude from the opposite sides of the horse's mouth, after the manner of a bridle bit. These protruding parts are fashioned to receive straps adapted to pass forwardly over the head of the animal, and arranged to be buckled, or otherwise suitably fastened together, thereby securely maintaining the device in place. One extremity of the metal tube projects downwardly from the mouth and is connected with a flexible tube provided with a bulb located between the rigid tube and a bottle, or other receptacle, with which the flexible tube is connected, the said receptacle containing the medicine to be administered. The metal tube is preferably trunnioned on the yoke to permit a limited degree of movement, since this is necessary in order that the tongue of the horse may be allowed the natural movement incident to swallowing liquid.

Having briefly outlined my improved construction, I will proceed to describe the same in detail, reference being made to the accompanying drawing, in which is illustrated an embodiment thereof.

In this drawing: Figure 1 is a view of a horse's head showing my improved device in position for use. Fig. 2 is a detail view of the device shown on a larger scale. Fig. 3 is a side view partly in section and partly broken away. Fig. 4 is a fragmentary section taken on the line 4—4, Fig. 2, the parts being shown on a larger scale. Fig. 5 is a detail view of a detached member of the yoke.

The same reference characters indicate the same parts in all the views.

Let the numeral 5, designate a tube composed of metal, hard rubber, or any other suitable material, which will give the tube sufficient strength and the necessary rigidity for the purpose. This tube is curved, as it extends forwardly, to conform to the shape of the mouth and throat of the animal and it is open at both extremities. Its rear end is connected with a flexible tube 6, preferably composed of rubber and having a pressure bulb 7, centrally located, and arranged between the rear extremity of the tube 5, and a receptacle 8, containing the medicine to be administered. This receptacle is preferably a bottle adapted to be held in one hand of the user, while the pressure bulb is engaged by the other hand. The tube 5, is connected intermediate its extremities with a yoke 9, having a central oval-shaped ring 10, through which the tube 5, passes, the said ring being so shaped as to allow the tube a limited degree of oscillating movement. To this end, the tube is trunnioned on the yoke. As shown in the drawing, the yoke has two laterally projecting members 12, whose inner extremities are threaded into the opposite ends of the ring 10, as shown at 13. The inner extremity of each yoke member 12, is provided with a journal or trunnion 14, which enters a socket 15, formed on the tube 5, thus permitting the tube a limited degree of oscillating movement, as heretofore explained, the opening in the ring 10, being somewhat larger than the tube, as shown at 16. (See Figs. 3 and 4.) The outer extremities of the members 12, are turned upwardly, as shown at 17, and terminate in eyes or loops 18, with which a fastening strap may be connected, said strap passing over the head of the animal and being secured in place by means of a buckle 20.

When the device is in use, the tube 5, is passed into the mouth of the animal far enough to cause the yoke members 12, to engage the upper part of the mouth as far as they will go, after which the strap 19 is buckled over the head of the horse in such a manner as to hold the device securely in place. Assuming that the medicine bottle 8, is connected with the tube 6, in operative relation, the said bottle is held in one hand, while the bulb 7, is pressed with the other hand, thus introducing the liquid to the mouth of the animal and discharging it into the upper part of the esophagus, whereby he is compelled to swallow it.

Having thus described my invention, what I claim is:

1. A drenching device, comprising a tube and a yoke, the tube being trunnioned on the yoke to permit a limited degree of oscillation, and means connected with the yoke for securing the device to the head of the animal, substantially as described.

2. A drencher, comprising a rigid tube, and a yoke, the latter being composed of a ring through which the tube passes, the opening being of sufficient size to allow the tube a limited degree of oscillation, the yoke having members threaded into sockets formed in the opposite sides of the ring, the said yoke members having trunnions adapted to enter sockets with which the opposite sides of the tube are provided, for the purpose set forth.

3. A drenching device, comprising a rigid tube and a yoke, the latter having a ring through which the tube passes, the opening in the ring being of sufficient size to allow the tube a limited degree of oscillating movement, laterally extending members threaded into opposite sides of the said ring, the said members having trunnions adapted to project through the ring and enter sockets formed on opposite sides of the tube, the said members also being provided with upturned outer extremities formed into rings adapted to receive a strap for securing the device within the mouth of the animal, and a flexible tube connected with the rigid tube below the said yoke, the flexible tube having an intermediate bulb for injecting liquid therethrough, substantially as described.

In testimony whereof I affix my signature in presence of two witnesses.

THEODORE N. JONES.

Witnesses:
A. J. O'BRIEN,
JESSIE F. HOBART.